US005082679A

United States Patent [19]

Chapman

[11] Patent Number: 5,082,679

[45] Date of Patent: Jan. 21, 1992

[54] METHOD FOR DETOXIFYING FOODSTUFFS

[75] Inventor: Russell R. Chapman, Mesa, Ariz.

[73] Assignee: Aflatoxin Limited Partnership, Cave Creek, Ariz.

[21] Appl. No.: 649,214

[22] Filed: Jan. 25, 1991

Related U.S. Application Data

[63] Continuation of Ser. No. 424,764, Oct. 20, 1989, abandoned.

[51] Int. Cl.$^{5}$ .................... A23B 9/18

[52] U.S. Cl. .................... 426/312; 426/319; 426/320; 426/321; 426/335

[58] Field of Search .................... 426/312, 319, 320, 321, 426/335

[56] References Cited

U.S. PATENT DOCUMENTS

| | | | |
|---|---|---|---|
| Re. 30,386 | 8/1980 | Brandt | 426/335 |
| 761,445 | 5/1904 | Caldwell et al. | 426/319 |
| 888,106 | 5/1908 | Mears | 426/319 |
| 2,641,542 | 6/1953 | Ulrey | 99/2 |
| 3,429,709 | 2/1969 | Masri | 99/2 |
| 3,585,041 | 6/1971 | Mann | 99/2 |
| 3,592,641 | 7/1971 | Rayner | 99/2 |
| 3,890,452 | 6/1975 | Brandt | 426/321 |
| 3,919,432 | 11/1975 | Elliger | 426/319 |
| 3,962,475 | 6/1976 | Forest et al. | 426/331 |
| 4,035,518 | 7/1977 | Carmona | 426/231 |
| 4,055,674 | 10/1977 | Yano et al. | 426/430 |
| 4,062,984 | 12/1977 | Lindquist | 260/412.4 |
| 4,335,148 | 6/1982 | Vidal | 426/319 |
| 4,338,343 | 6/1982 | Vidal | 426/331 |
| 4,350,709 | 9/1982 | Vidal | 426/69 |
| 4,421,774 | 12/1983 | Vidal | 426/319 |
| 4,450,178 | 5/1984 | Korsgaard | 426/69 |
| 4,474,816 | 10/1984 | Wilson, Jr. et al. | 514/691 |
| 4,780,279 | 10/1988 | Enos | 426/320 |

OTHER PUBLICATIONS

Park et al., "Review of the Decontamination of Aflatoxins by Ammoniation: Current Status & Regul.".

J. Assoc Off. Anal. Chem. (vol. 7, No. 4, 1988), pp. 685-703.

Jorgensen, "Atmospheric Pressure, Ambient Temperature Reduction of Aflatoxin $B_1$ in Ammoniated Cottonseed", J. Argric. Food Chem, 1981, 29, 555-558.

Price "Ammoniation of Whole Cottonseed at Atmospheric Pressure and Ambient Temperature to Reduce Aflatoxin M1 in Milk", Journal of Food Protection, vol. 45, No. 4, pp. 341-344, March 82.

Price, "Effects of Processing on Aflatoxin Levels and on Mutogenic Potential of Tortillas Made From Naturally Contaminated Corn", J. Food Sci., 50(2):347-349 & 357, 1985.

Camou-Arriola "Destruction of Aflatoxin and Reduction of Mutagenicity of Naturally-Contaminated Corn During Production of a Corn Snack", Journal of Food Protection, (Galley Proof) Publication Date Unknown.

Uaguchi, "Toxicology Biochemistry and Pathology of Mycotoxins", John Wiley and Sons, New York, 1978, pg. 276.

Kilman, "With No Remedy Available, Anti-Aflatoxin Potions Sell Like Crazy", Wall Street Journal, (Date Unknown).

*Primary Examiner*—Donald E. Czaja
*Assistant Examiner*—Jean Aberle

[57] ABSTRACT

An improved method for de-toxifying aflatoxin contaminated foodstuffs is provided by pre-treating the contaminated foodstuff with a wetting agent prior to exposure to the de-toxicant. An aqueous solution of detergent or soap is a suitable wetting agent which can be applied to the foodstuff by spraying or immersion. Ammonia gas is the preferred de-toxicant. Once the wetting agent has been applied, the de-toxification reaction is exothermic so that little or no heat need be added to reach the elevated temperatures that facilitate rapid de-toxification. The process runs at atmospheric pressure in low cost vessels and may be accomplished in times of an hour or less without external heat sources.

19 Claims, 3 Drawing Sheets

METHOD FOR DETOXIFYING FOODSTUFFS

This application is a continuation of prior application Ser. No. 07/424,764, filed 10/20/89, abandoned.

FIELD OF THE INVENTION

This invention concerns an improved method for de-toxifying foodstuffs and, more particularly, an improved method for de-toxifying foodstuffs containing aflatoxins and similar naturally occurring contaminants.

BACKGROUND OF THE INVENTION

There are many foodstuffs that are susceptible to contamination by mold and bacteria and products thereof. For example, grains and feeds that have been exposed to warm humid atmospheres can become contaminated by aflatoxins. Aflatoxins are highly toxic carcinogenic substances produced by the naturally occurring molds *Aspergillus flavus* and *Asgergillus parasiticus*. Unless the affected material is de-toxified, the aflatoxins can cause severe damage and death to animals or humans who ingest the affected foodstuffs. Hence, there is an ongoing need for economical processes for de-toxifying aflatoxin contaminated agricultural products intended for human or animal consumption.

A number of techniques have already been developed for de-toxifying aflatoxin contaminated foodstuffs. The following patents and article are incorporated herein by reference and describe the results set forth below by way of example.

In U.S. Pat. No. 2,641,542, Ulrey describes de-toxification of tung meal by treatment with anhydrous ammonia or amines at a temperature typically in the range of 200°-250° F. at a pressure of about 4 atmospheres for a period of 30-60 min. Below these temperatures and pressures the reaction is too slow to be useful. Ulrey states that it is not necessary to wet the meal or separate the reaction products.

In U.S. Pat. No. 3,429,709, Masri et al., describe detoxification of agricultural products contaminated with aflatoxins by mixing in at least 0.3 gms and preferably 10-30 gms of NH3 per kilogram of foodstuff and heating to 20°-121° C. for times ranging from 7-14 days at the lower temperatures to 30-60 minutes at 121° C. Masri found that it was desirable that 10-15 % moisture be present during de-toxification either as liquid or steam since it increased the rate and degree of de-toxification. For ammonia in gaseous form, Masri et al. pressurized the treatment chamber to 5-40 psig with the gas. After treatment, the ammonia was removed from the material by evacuation or by purging with air or nitrogen or other inert gas. When moisture had been added, a post treatment drying step was also used.

In U.S. Pat. No. 3,585,041, Mann et al., describe de-toxification of peanut meal contaminated with aflatoxins by mixing the meal with methyl amine in a closed vessel at atmospheric pressure and a temperature of about 75°-100° C. for times of an hour to a Week. The amine was then removed and the meal dried. If the moisture content of the meal was below about 7 %, water was added before treatment.

In U.S. Pat. No. 3,890,452, Brandt et al., disclose a method of reducing the aflatoxin content of contaminated oilseed meal by combining the meal with water, at least one oxide and/or hydroxide of an alkali metal or alkaline earth metal, and at least one organic amine. The mixture must have a pH of at least 8, preferably 9.5 or higher. The mixture is reacted at a temperature of 70°-150° C. for time ranging from 10 minutes to 15 days at atmospheric pressure or above, and then dried. The higher the temperature and pressure the shorter the required treatment time.

In U.S. Pat. No. 3,919,432, Elliger et al., describe a method for reducing the aflatoxin contamination of jojoba meal by storing the meal in a closed container in contact with 5-10% by weight of ammonia, e.g., as ammonium hydroxide or as gas, for 25-35 days. The meal should contain 20-25% water by weight.

In U.S. Pat. No. 4,035,518, Carmona describes a method for obtaining aflatoxin free foodstuffs, such as whole grains, seeds, or kernel nuts by exposing the foodstuffs to a weakly alkaline aqueous solution for a short period of time (e.g., 5-15 min. at 180°-213° F.), washing with water to a neutral pH and then picking out the aflatoxin contaminated grains or kernels which become colored as a result of the treatment.

In U.S. Pat. Nos. 4,421,774, 4,338,343, 4,335,148 and 4,350,709, Vidal et al., teach various methods for detoxification and preservation of grain by perfusion with (i) sulfur dioxide gas bubbled through an organic acid such as propionic acid, followed by or combined with (ii) ammonia gas perfusion.

In U.S. Pat. No. 4,450,178, Korsgaard discloses a method for supplying ammonia to baled straw to reduce aflatoxin contamination therein. The ammonia is supplied in gaseous form through hollow tines used for handling the bale.

De-toxification of aflatoxin contaminated agricultural products by ammoniation and other methods has also been extensively discussed in the technical literature. The article by D. L. Park et al., entitled "Review of the Decontamination of Aflatoxins by Ammoniation: Current Status and Regulation", J. Assoc. Off. Anal. Chem (Vol. 71, No. 4, 1988), pp. 685-703 is noteworthy. Some of the results reported by Park et al., are summarized in Table I below.

Despite the many years of intense effort by researchers throughout the world, the processes available for de-toxification of foodstuffs contaminated with aflatoxins and the like are far from ideal. For example, those processes that are effective at atmospheric pressure and low temperatures usually take unduly long times; processes that have short processing times usually require higher temperatures and/or pressures and more expensive treatment chambers; and processes that provide rapid processing at low temperatures and atmospheric pressure usually require expensive materials or post-treatment steps.

Table I following, shows a summary of reported data, according to Park et al., ibid., for various foodstuffs treated with ammonia or ammonia compounds at pressures of 1-3 atmospheres and at temperatures in the range of 10°-145° C. for time periods of 0.25-1008 hours and for various moisture contents. The numbers shown in parentheses following the foodstuff name refer to the citations in Park et al., ibid. The entries "AT" in the temperature column refer to "Ambient Temperature" and the entries "ND" in the final aflatoxin level column refer to "none detected" or the like.

TABLE I

AFLATOXIN LEVELS IN PPB IN FOODSTUFFS TREATED AT 1-3
ATMOSPHERE WITH THE INDICATED TEMPERATURES AND TIMES

| FOODSTUFF | MOIST. (%) | TEMP. °C. | TIME (HRS) | AFLATOXIN INITIAL | LEVELS FINAL | DE-TOXIFICATION MATERIAL |
|---|---|---|---|---|---|---|
| *TREATMENT AT ATMOSPHERIC PRESSURE* | | | | | | |
| PEANUT MEAL (67) | 30 | 100 | 2 | 111 | 10 | NH4CO3 + NaOH |
| CORN (68, 69) | 17.5 | 10 | 1008 | 1000 | <20 | 1.5% AMMONIA |
| " | " | 25 | 192 | " | " | " |
| " | " | 40 | 48 | " | " | " |
| " | 12-17.5 | 25 | 288 | 180 | ND | " |
| CORN (70) | 15 | 25 | 504 | 600 | <20 | AMMONIA |
| " | " | 38 | 72 | " | " | " |
| " | 17.5 | AT | 312 | 750 | <5 | 1.5% AMMONIA |
| PEANUT MEAL (81) | 20 | AT | 240 | 2500 | <25 | 5% AMMONIA |
| PEANUT MEAL (82, 83) | 15 | AT | 120 | 970 | 450-413 | 3-5% AMMONIA |
| " | " | 50 | 120 | " | 34-21 | 3-5% AMMONIA |
| PEANUT MEAL (84) | 20 | AT | 240 | (79% REDUCTION) | | 5% AMMONIA |
| MAIZE (84) | " | AT | 240 | (97% REDUCTION) | | " |
| COTTON SEED (85-87) | 20 | AT | 504 | 1500-1900 | 55 | 1.5% NH4OH |
| COTTON SEED (88) | 7.5 | 43 | 240 | 800 | <20 | 2.0% AMMONIA |
| " | 7.5 | 21-43 | 360 | " | " | " |
| " | 20 | 43 | 360 | " | " | " |
| CORN (65) | 20 | 145 | 3 | 270 | 3 | 0.5% AMMONIA |
| PEANUT MEAL (5) | 15-20 | 100 | 1 | (95% REDUCTION) | | 7% NH3 @ 1 ATM |
| *TREATMENT ABOVE ATMOSPHERIC PRESSURE* | | | | | | |
| PEANUT MEAL (92) | 17 | 118 | 1 | 1977 | 32 | 4% NH3 @ 26 PSIG |
| (92) | " | 124 | 0.5 | " | 112 | 4% NH3 @ 27 PSIG |
| (92) | " | 100 | 2.5 | 1000 | 50-240 | 3% NH3 @ 5 PSIG |
| CAKES/MEALS (50-53) | 15 | 95 | 0.5 | 600 | ND | DRY NH3 @ 3 BARS |
| COTTON SD. ML. (60) | 14 | 100 | 0.5 | 4000 | <4 | 4% NH3 @ 40 PSIG |
| COTTON SD. ML. (57) | 10 | 82 | 0.5 | 425 | ND | 4% NH3 @ 30 PSIG |
| PEANUT MEAL (60) | ? | 80 | 0.25 | 1148-1530 | 32-75 | NH3 GAS @ 3 BARS |
| PEANUT MEAL (64) | ? | 80 | 0.25 | 980-1140 | 30-60 | NH3 GAS @ 3 BARS |
| COTTON SD. ML. (48) | 15 | 93 | 0.5 | 334 | 3 | DRY NH3 @ 45 PSIG |

In the experiments summarized in Table I, significant reduction in aflatoxin contamination levels was observed. But, it is also apparent from the data in Table I that aflatoxin de-toxification times of many hours are required using prior art methods with ammonia or ammonia compounds unless the foodstuff-ammonia mixture is heated to at least about 100° C. and/or the pressure raised to several atmospheres during de-toxification. It is expensive to supply heat and/or pressure to the foodstuff-de-toxicant mixture. Hence, these prior art measures are less desirable.

A further difficulty with some prior art de-toxification treatments is the tendency for aflatoxin levels to recover or rebound after the de-toxification. This is referred to in the art as "reformation". Reformation apparently occurs naturally and is accelerated by exposing de-toxified materials to neutral or acidic conditions, such as may be encountered during storage or in animal or human digestive tracts. Thus, if the storage or digestive period is prolonged, foodstuffs that appear to have acceptably low levels of aflatoxin after decontamination, may recover during storage or digestion to potentially harmful aflatoxin levels. Thus, a further measure of the effectiveness of a de-toxification method is the amount of aflatoxin reformation that is encountered after de-toxification, particularly after exposure to acid environments.

It has been found that materials de-toxified using the least expensive prior art techniques such as those employing the shortest treatment times and lowest temperatures and which operate at atmospheric pressure, are more prone to significant reformation. This is a substantial disadvantage of such prior art methods.

Thus, none of the prior art processes is completely satisfactory, and there is a continuing need for improved methods of treating agricultural products contaminated with aflatoxins and the like.

BRIEF SUMMARY OF THE INVENTION

It is an object of the present invention to provide an improved method for de-toxifying foodstuffs such as for example, agricultural products, that have been contaminated with aflatoxins or similar poisons. It is a further object to provide an improved process that is effective at atmospheric pressure, that uses inexpensive containment vessels, that requires little or no external heat input, that involves comparatively brief treatment times, that is low in cost, and that yields a de-toxified product that is resistant to aflatoxin reformation, even after exposure to acidic environments.

The foregoing and other objects and advantages are provided by a process for treating foodstuffs to reduce contamination, especially naturally occurring contaminants such as aflatoxins, comprising, pre-treating the contaminated material with a wetting agent and then exposing the pre-treated material to a de-toxification agent. A simple atmospheric pressure enclosure for holding the de-toxification agent in contact with the agricultural product is sufficient. A pressurized system is not needed.

A mild detergent or soap solution has been found to be effective as a wetting agent. The pH level of the wetting agent is important. Gaseous ammonia or ammonia-water or water vapor mixture is preferred for the de-toxification agent. The reaction between the ammonia and the contaminated material pre-treated with the wetting agent is exothermic and heats the material, thereby accelerating the reaction. Little or no additional heat is needed. Unreacted ammonia may be recovered and re-used.

DETAILED DESCRIPTION OF THE FIGURES

As used herein, the words "foodstuff" or "foodstuffs" are intended to refer generally to materials for human or animal consumption, such as for example but not limited to, agricultural products. Particular non-limiting examples are grains, seeds, meals, nuts, flours, fibers and combinations thereof. These and other foodstuffs may be de-toxified by the invented process.

Figure 1:
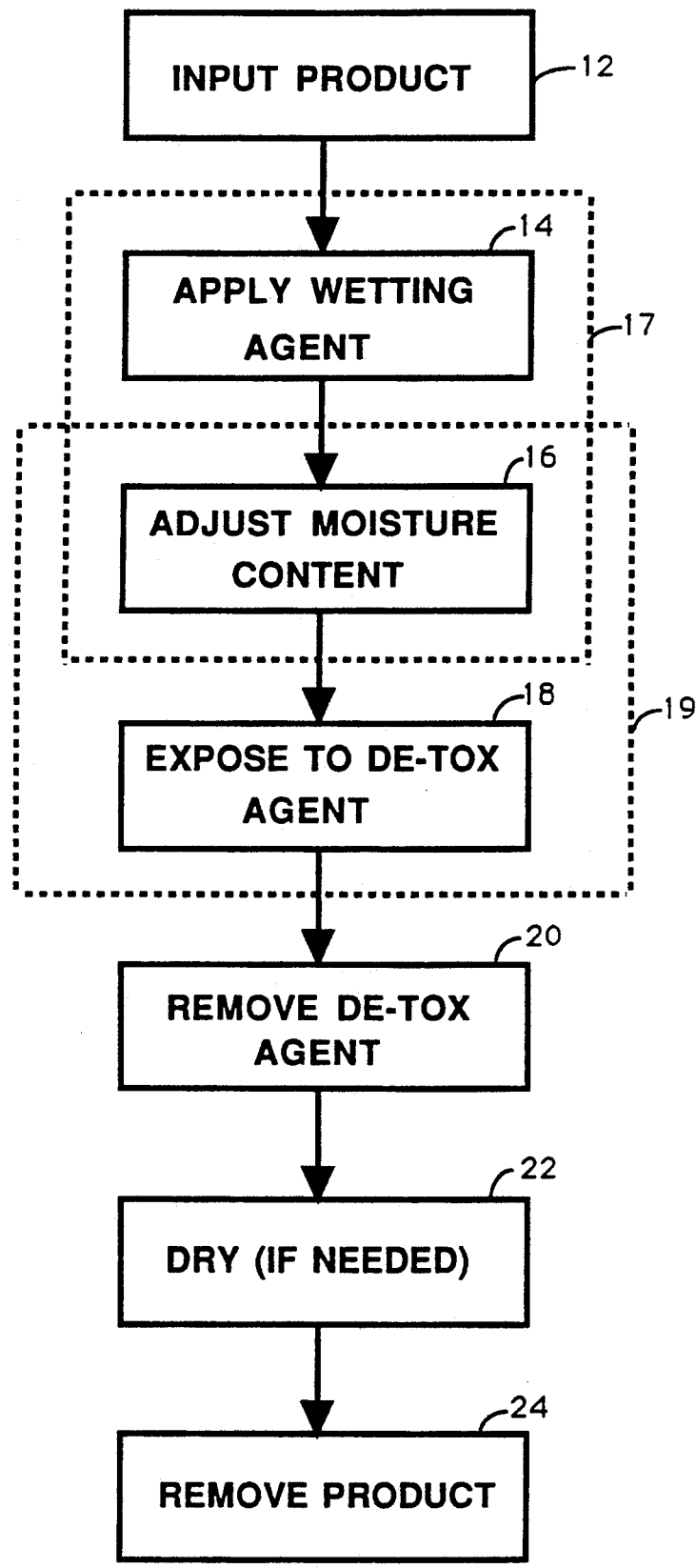
FIG. 1 is a simplified flow chart of a preferred embodiment of the invented method.

FIG. 1 shows a simplified flow diagram illustrating a preferred embodiment of the invented method. Input product 12 receives wetting agent 14 and optional moisture adjusting agent 16. These may be provided separately or, as indicated by dashed line 17, together. While FIG. 1 shows the wetting agent being applied before adjusting the moisture content (or both together). the moisture content maybe adjusted before applying the wetting agent. Alternatively the moisture adjustment may be provided during the following de-toxification step, as indicated by dashed line 19 in FIG. 1, or a combination thereof. The amount of moisture to be added, if any, depends on the initial moisture content of the starting product and the amount of moisture provided by the wetting agent which, in its preferred form, is an aqueous solution.

The pre-treated product is exposed to de-toxifying agent 18 for a predetermined time sufficient to reduce the aflatoxin contamination to the desired level. The de-toxification agent is then removed at 20, the product dried at 22, if necessary, and removed at 24.

While it has been known that the effectiveness of most de-toxification agents is enhanced by increasing the moisture content of the product, especially for dry products, it has not been appreciated that the effectiveness of the de-toxification agent can be significantly enhanced by pre-treating the product with a wetting agent. The Wetting agent is believed to foster the reaction between the de-toxification agent and the aflatoxin contaminant by facilitating absorption of the de-toxicant. Among other things, the wetting agent emulsifies any surface oils which might otherwise act as a barrier to absorption of the de-toxicant. Thus, the wetting agent facilitates neutralization of the aflatoxin.

Wetting agent 14 may be in any convenient form. An aqueous solution of common household or commercial detergent or soap has been found to give satisfactory results with a number of foodstuffs. The detergent or soap in the Wetting agent may be used straight out of the bottle (e.g., undiluted, or a carrier may be added. Dilution is desirable since most commercial or household detergent or soap is relatively concentrated and, since good results are achieved with comparatively low concentration solutions, dilution provides a substantial saving in the cost of wetting agent 14. Suitable detergent or soap concentrations in wetting agent 14 are 0.5-50% detergent (or soap) by weight, with 1-10% being convenient and about 3% being typical. The balance is preferably water.

While many other Wetting agents, such as for example, ethylene or propylene glycol are believed to enhance de-toxification of aflatoxin, they may in themselves be toxic if left behind in the foodstuff. Care should be taken to avoid this. In general, any non-toxic soap or detergent or other wetting agent that does not adversely affect the taste, nutrition, safety or other important properties of the product may be used.

It is desirable that the pH of wetting agent 14 be adjusted to the range of 7-13, preferably 8-10, and typically about 10-11. NaOH is conveniently used for adjusting the pH, but other nontoxic bases will also serve.

The wetting agent may be applied to the product by any convenient method, as for example, by spraying the wetting agent solution on the product or by briefly soaking the product in the wetting agent solution.

As those of skill in the art will understand, use of an aqueous carrier for the wetting agent can also serve to increase the moisture content of the product. This is particularly desirable where the foodstuffs are grown or stored in dry climates where moisture content may be low. However, use of an aqueous carrier for the wetting agent is not essential and organic carriers or combinations thereof may also be used. Alcohols are example of suitable organic carriers. While other carriers may be used, water is preferred because it is inexpensive, non-toxic and easily removed. Where the moisture content of the product is already suitable, the step of adjusting the moisture content may be omitted.

Ammonia is preferred for de-toxification step 18. It is well known to be useful for de-toxifying aflatoxin contaminated products, it is easily stored and handled, it is relatively inexpensive, and it readily dissipates from the foodstuffs after treatment. Since only part of the ammonia reacts during the de-toxification step, the balance may be easily recovered and reused. This reduces the process cost. Ammonia has the further advantage of being a useful long term preservative that may be retained for considerable periods in the foodstuff by placing the foodstuff in a sealed container immediately after de-toxification and before the ammonia absorbed by the material has dissipated.

The effectiveness of the aflatoxin-ammonia reaction is enhanced by the pre-treatment with the wetting agent. Hence, the de-toxification process using ammonia is particularly cost effective. However, the invented process is believed to be effective when combined with other detoxification agents as well, as for example, sulfur dioxide and amines. Those of skill in the art will understand, based on the description herein, how to choose suitable alternative de-toxicants. In general, those de-toxicants whose activity increases with increasing moisture content in the product are believed to have their activity enhanced by the above-described pre-treatment with a wetting agent and thus may be substituted for the preferred ammonia de-toxicant. However, de-toxicants that are in themselves health hazards or that produce reaction products that are health hazards or that leave undesirable residues should not be used unless great care is taken to remove the hazardous material or products after treatment.

Those of skill in the art will appreciate based on the description herein that the above-described process illustrated in FIG. 1 may be practiced on a batch basis where each step is perform ®d individually on a particular batch of product, or on a continuous basis where product flows through successive steps in the process which are operating continuously. or by using a combination of the two. The container holding the product during processing should be substantially impervious to the wetting agent and its carrier, to the moisture adjusting agent, and to the de-toxicant being applied.

Figure 2B:
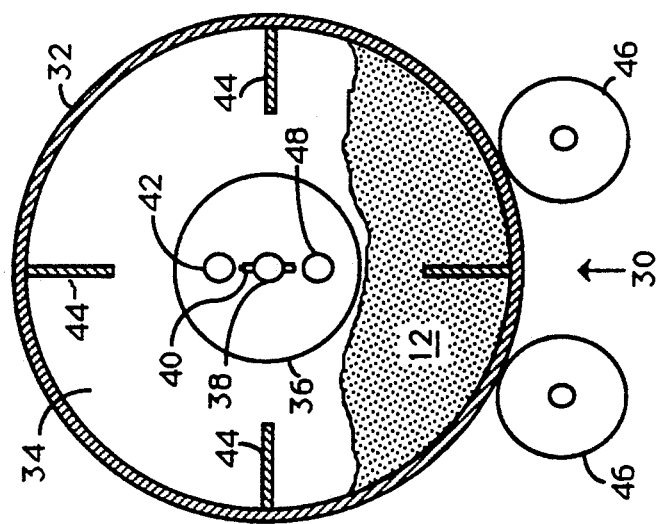
FIG. 2A is a simplified partially cut-away side view of an apparatus used to practice the invented method according to a first embodiment thereof and FIG. 2B is a simplified cross-sectional end view through the apparatus of FIG. 2A.
Figure 2A:
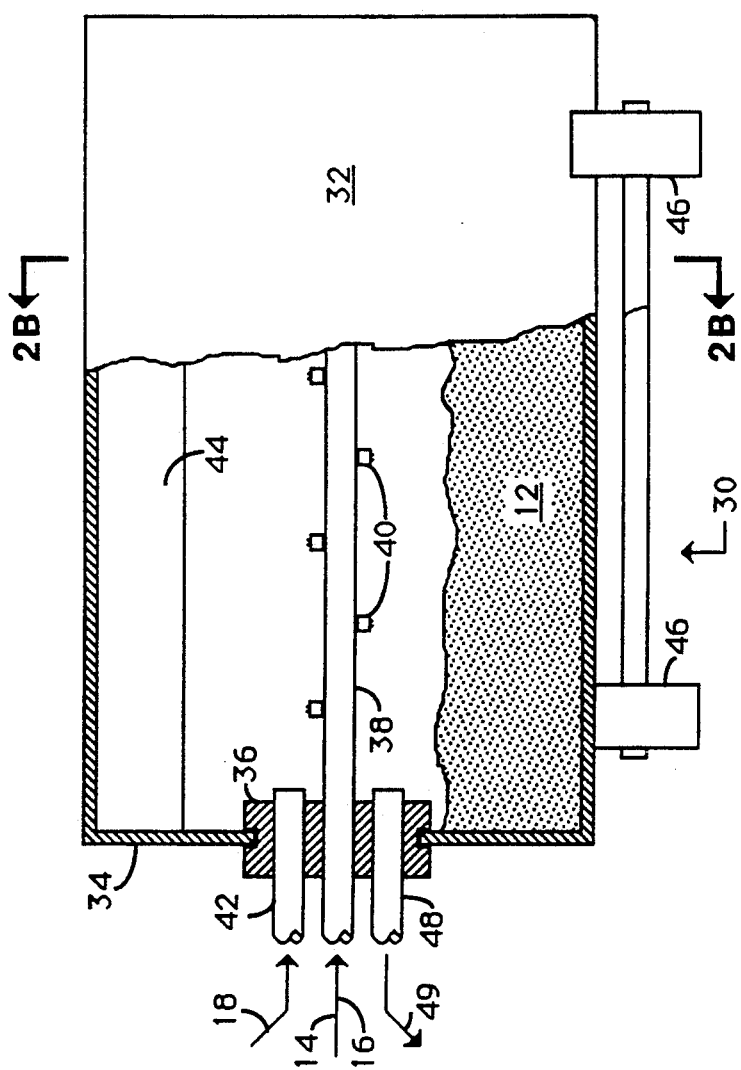

FIG. 2A is a simplified partially cut-away side view of rotatable cylindrical reaction chamber 30 suitable for practicing the method of the present invention on a batch basis and FIG. 2B is a simplified cross-sectional end view through the chamber of FIG. 2A.

Chamber 30 has side-wall 32 and end-wall 34 through which protrudes demountable header 36. Chamber 30 is conveniently provided with longitudinal baffles 40 which assist in tumbling and mixing product 12 with wetting agent 14, moisturizer 16, and de-toxicant 18 as chamber 30 is rotated. Chamber 30 conveniently rests on rotatable supports 46 which, when turned, rotate chamber 30 about header 36. One or more access ports (not shown) may be provided for loading and unloading the product.

A rotating joint is desirably provided between header 36 and end wall 34 of chamber 30. Header 36 comprises axially located distribution manifold 38 which has mounted thereon multiple spray heads 40. Wetting agent 14 and optional moisturizer 16 are introduced into chamber 30 through header 36, manifold 38 and spray heads 40. Spray heads 40 are conveniently of a type which dispense Wetting agent 14 and moisturizer 16 as a fine mist, but other types may also be used. Header 36 is also provided with inlet 42 through which de-toxicant 18 is supplied to chamber 30. Header 36 also conveniently contains vent 48 for removing exhaust products 49.

Chamber 30 is conveniently constructed of Fiberglas or other substantially inert material. A convenient chamber capable of holding about 100 lbs of grain or the like has a length of about 44 inches and diameter of about 20 inches. Header 36, manifold 38, spray heads 40 and baffles 44 are conveniently of metal or plastic or a combination thereof, but other structural materials will also Manifold 38 is conveniently a ½ inch diameter pipe.

Chamber 30 is typically filled with 50–100 lbs of input foodstuff 12, as for example corn, through a loading port or through the opening provided by removing header 36. Header 36 is re-installed and manifold 38 connected to a source of wetting agent 14 and moisturizer 16. In the preferred embodiment of the invention, wetting agent 14 is a weak detergent solution in water and a separate moisturizing agent is not necessary. A pump (not shown) is provided to force wetting agent 14 through manifold 38 and spray heads 40 while chamber 30 is rotated to tumble product 12 so that product 30 is uniformly coated by wetting agent 14. If additional moisturization of product 12 is needed it is conveniently accomplished by supplying water or water vapor through manifold 38.

Spraying foodstuff 12 with wetting agent 14 (and moisturizer 16) forces air out of chamber 30 through vent 48, but little of wetting agent 14 is lost in this manner. Typically, two gallons of a mixture consisting of about 3% by weight of detergent in water is used per hundred pounds of foodstuff (e.g., corn) as a combined wetting a moisturizing agent. This typically provides about 15% moisture increase, for example, from a starting level of about 7% moisture to about 22% moisture. This is preferably accomplished prior to introducing the de-toxicant. The dilute wetting agent is very convenient for this purpose since it provides both the wetting agent and the desired additional moisture in a single step. If a smaller or larger moisture increase is needed to reach the desired moisture level, then the quantity or concentration of detergent-water mixture sprayed on the foodstuff is adjusted accordingly.

It is desirable that the amount of detergent-water mixture provided be such that it is substantially completely absorbed by the foodstuff. Ordinarily, there are no puddles or other solution accumulations in the chamber. Total absorption of the detergent-water solution is desirable from the point of view of economy of processing, since no excess solution need be provided.

As those of skill in the art will appreciate, whether or not moisture must be added to the product depends on the type of product being treated and its initial moisture content. It is believed that for most products, a moisture content in the range of 10 to 35% (by weight) is desirable with about 15 to 30% being convenient, and about 20 to 25% being preferred.

Once the intended amount of wetting agent 14 (and moisture) has been provided, detoxification agent 18, preferably in the form of anhydrous ammonia gas, is rapidly introduced via inlet 42 while chamber 30 continues to rotate. Vent 48 may be sealed or left open. There is no difficulty in introducing ammonia 18 into chamber 30 event when vent 48 is closed because there is an immediate reaction between the ammonia and the wetted foodstuff which causes rapid absorption of the ammonia.

For example, with vent 48 closed, when ammonia is introduced into chamber 30 from a pressurized anhydrous ammonia storage tank (tank pressure equals about 130 psig), and depending on the ammonia flow rate and duration, the pressure in the reaction chamber may stay around atmospheric pressure, may rise above atmospheric pressure or may fall below atmospheric pressure, as for instance by 10 to 20 inches of Hg, and then recover toward atmospheric pressure (0 inches of Hg) as the environment inside the chamber becomes saturated with ammonia.

It is convenient to adjust the ammonia flow rate so that there is rapid saturation with ammonia without much overshoot, i.e., so that the peak chamber pressure during ammonia charging remains within a few pounds per square inch of atmospheric pressure and does not approach the bursting strength of the comparatively thin Walled reaction chamber being used. It Was found that the peak pressure during charging could be easily held below 20 psig and typically much closer to atmospheric pressure (0 psig).

Once the internal atmosphere has become fully saturated With ammonia and the pressure stabilized at about atmospheric pressure, which occurs typically in about 0.5–5 minutes, the ammonia supply may be shut off and the chamber operated as a closed system without further ammonia injection. Typically, about 1 to 4 pounds of anhydrous ammonia gas input is adequate for treating a 100 pounds of corn or similar foodstuffs in the above-described chamber, but larger or smaller amounts are also useful.

Some amount of the injected ammonia gas remains un-reacted and may be recovered and re-used to reduce the de-toxicant cost. The amount of ammonia may also be adjusted in accordance with the level of aflatoxin contamination, with larger amounts being used for highly contaminated samples and smaller amounts for less highly contaminated samples. Those of skill in the art will understand based on the teachings herein how to adjust the amount of ammonia used to suit the particular materials being treated, their condition (e.g., milled, raw seed, cake, etc.), and aflatoxin levels encountered, without undue experimentation.

It is observed that when the ammonia is injected, the chamber and the foodstuff inside become hot without any external heat being applied. This is unexpected since, ordinarily, the rapid expansion of the ammonia gas from the tank pressure of about 130 psig to about atmospheric pressure in the reaction chamber should cause rapid cooling of the ammonia and the foodstuff in contact therewith. Accordingly, the observed heating is believed to arise from an exothermic, i.e., heat evolving, reaction of the ammonia with the wetting solution pretreated foodstuff.

The chamber and foodstuff temperature rapidly rises (e.g., within 1-7 minutes or less) from ambient temperature (e.g., 20°-35° C.) to a peak of about 50°-60° C. as the ammonia is injected and the pressure stabilized and then slowly decays over the remaining de-toxification time (typically 0.5-1.5 hours) toward ambient temperature. The rate of temperature rise depends on the ammonia injection rate, the moisture content of the foodstuff, the size of the charge relative to the tank size and whether or not the tank is insulated. In general, the product is still significantly warm to the touch when de-toxification is completed and the product is removed from chamber 30 an hour or more later.

Once de-toxification is complete the treated product is removed from chamber 30 and either (i) stirred or spread in the air for, a brief time (order of magnitude about 1 hour) to allow the residual ammonia and excess moisture, if any, to desorb from the product, or (ii) promptly placed in a sealed container so that the maximum residual ammonia is retained with the foodstuff as a fumigant for long term storage purposes, or (iii) a combination thereof when lesser amounts of retained ammonia are desired.

The aflatoxins content of the foodstuffs is determined by taking a random sample from the untreated and treated material, typically 200 gms, grinding or pulverizing it to a standard size and then analyzing the sample for aflatoxins using the Association of Analytical Chemists (AOAC) Official Method A26.026-0.031. The aflatoxins extracted are typically separated on thin layer plates and quantified by comparison to known standard amounts. Such testing techniques are well known in the art (see for example AOAC 1984, "Official Methods of Analysis," 14th Edition, Chapter 26, Association of Official Analytical Chemists, Arlington, Va.). Ordinarily at least three samples are tested per run, an untreated control sample, a de-toxified sample, and a de-toxified sample that has been exposed to 0.1 N HCl solution to stimulate reformation, if any.

EXAMPLES

Table II shows the results of a number of tests on foodstuffs treated under various conditions according to the de-toxification method of the present invention. The meaning of the abbreviations in the table are shown in the legend at the end.

TABLE II

| | AFLATOXIN LEVELS IN PPB IN FOODSTUFFS TREATED IN A CLOSED CHAMBER WITH THE INDICATED TEMPERATURES AND TIMES ACCORDING TO THE PRESENT INVENTION | | | | | | | |
|---|---|---|---|---|---|---|---|---|
| FOODSTUFF | MOIST. (%) | WETTING AGENT | TEMP. °C. | TIME (HRS) | AFLATOXIN LEVELS | | | COMMENTS |
| | | | | | START | END | ACIDIFY | |
| CORN | 15 | AM | NA | 1 | 420 | 25 | 25 | CRACKED |
| CORN | 20 | AM | NA | 0.5 | 150 | 20 | 20 | " |
| CORN | 25 | AM | 48 | 1 | 150 | TR | TR | " |
| CORN | 17 | AM | 50 | 1 | 156 | 12 | 12 | " |
| CORN | 15 | AM | 46 | 1 | 156 | 16 | 16 | " |
| CORN | 25 | AM | NA | 1 | 520 | 80 | 80 | " |
| CORN | 20 | AM | 58 | 1 | 139 | 12 | 12 | " |
| CORN | 20 | AM | 58 | 0.25 | 139 | 20 | 20 | " |
| CORN | 20 | AM | 78 | 1 | 139 | TR | TR | CRACKED (IT) |
| CORN | 20 | BH | 52 | 1 | 75 | 32 | 32 | " |
| CORN | 20 | LC | 49 | 1 | 75 | 32 | 32 | " |
| CORN | 20 | PL | 56 | 1 | 75 | 10 | 10 | " |
| CORN | 20 | IV | 58 | 1 | 75 | TR | TR | " |
| COTTON SEED | 17 | AM | 58 | 1 | 100 | 15 | 15 | WHOLE SEED |
| COTTON SEED | 17 | AM | 48 | 1 | 100 | 24 | 24 | " |
| COTTON SEED | 17 | AM | 56 | 1 | 25 | TR | TR | MEAL |

START = AFLATOXIN LEVEL IN UNTREATED INPUT MATERIAL.
END = AFLATOXIN LEVEL AFTER DETOXIFICATION TREATMENT.
ACIDIFY = REFORMED AFLATOXIN LEVEL AFTER ACIDIFICATION TREATMENT.
TEMP. = PEAK TEMPERATURE.
NA = NOT MEASURED.
TR = TRACE.
IT = INSULATED TANK, 100 # CHARGE.
AM = ACT-M CONCENTRATED MULTIPURPOSE ORGANIC CLEANER, MULTIWAY ASSOCIATES, BATESVILLE, AR.
BH = BASIC-H CONCENTRATED ORGANIC CLEANER, SHAKLEY CORP., SAN FRANCISCO, CA.
LC = REGULAR LIQUID ORGANIC CLEANER, AMWAY CORP., ADA, MI.
PL = PALMOLIVE DISHWASHING LIQUID, COLGATE-PALMOLIVE CO., NY, NY.
IV = IVORY DISHWASHING LIQUID, PROCTER AND GAMBLE, CINCINNATI, OH.

The corn and cotton seed utilized for these tests was obtained from "red tagged" material rejected by the Arizona State Health Department as having excessively high aflatoxin levels for foodstuffs. (The aflatoxin limit for agricultural products intended for the human food chain is typically 20 ppb or less.) Batches of contaminated corn or cotton seed were drawn from this raw material and a portion of each batch set aside as the control sample for determining the initial aflatoxin level. Test samples from each batch ranging in size from 0.5-100 lbs were treated with a solution containing the indicated wetting agent in water and sufficient NaOH to provide the desired pH, e.g., 7-13, typically about 10-11. The treatment with the wetting agent solution also served to raise the moisture content to the typical range of about 15-25%.

The samples treated with the pH adjusted wetting agent solution were then injected with anhydrous ammonia to saturate the sample with ammonia. As previously noted, this produced an immediate rise in the temperature of the material. The temperatures indicated in Table II are the peak temperatures reached within about 1-7 minutes, typically within 2-5 minutes after start of gas injection. The temperature then decays toward room temperature during the remainder of the test run. In most cases, the runs were made in an un-insulated plastic tank. Under these circumstances, the average temperature during the treatment time is substantially less than the peak temperature.

It can be seen that the de-toxification treatment produces a significant drop in the aflatoxin level for treatment times of an hour or less at peak temperatures less than 78° C. The run carried out in the insulated tank (IT) was more effective because the insulation allowed the foodstuff to reach a higher peak temperature and retarded the temperature decay so that, other things being equal, the average temperature during the run was higher. No external heaters were used during these runs.

Portions of each of the control and de-toxified samples were analyzed to determine their aflatoxin levels. This provided the data shown in the "start" and "end" columns. Portions of the de-toxified samples were also exposed to 0.1 N HCl for about 30 minutes to encourage aflatoxin reformation. This is important because it is known that reformation of aflatoxin can occur in foodstuffs de-toxified with bases when such foodstuffs are acidified (see for example, Price and Jorgensen, "Effects of Processing on Aflatoxin Levels and on Mutagenic Potential of Tortillas made from Naturally Contaminated Corn", Journal of Food Science, Vol. 50 (1985), pages 347-349, 357).

Since acidification occurs naturally during both human and animal digestion, the susceptibility of de-toxified foodstuffs to aflatoxin reformation is an important measure of the utility of any de-toxification process. Unless the de-toxification process can be shown to yield foodstuffs that are resistant to reformation, the de-toxification process may have little practical application.

The treated and acidified samples were tested to determine whether any aflatoxin reformation had occurred. This provided the data shown in the "acidify" column. As can be seen from Table II, none was observed. This is an important result because it indicates that the invented method not only significantly reduces the initial aflatoxin levels but also provides de-toxified foodstuffs that are resistant to aflatoxin reformation.

Figure 3:
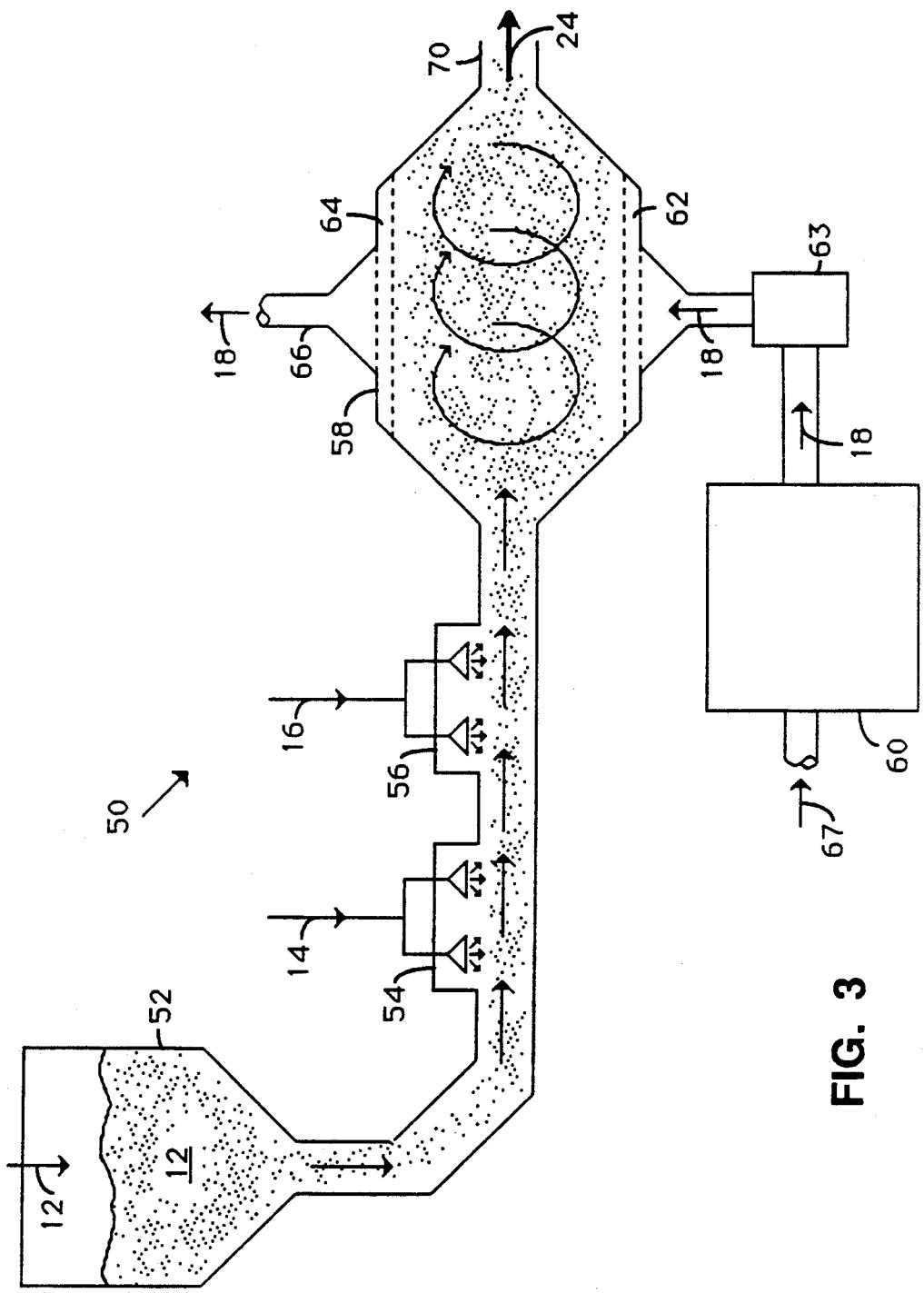
FIG. 3 is a simplified schematic diagram illustrating an apparatus used to practice the invented method according to a further embodiment thereof.

FIG. 3 is a simplified schematic diagram illustrating apparatus 50 used to practice the invented method on a continuous or semi-continuous basis. Product 12 is placed in product hopper 52 from whence it flows into wetting agent application chamber 54 wherein wetting agent 14 is applied. Product 12 then flows into optional moisture adjustment chamber 56 where moisture adjustment 16 is provided. As indicated by dashed lines 17 and 19 in FIG. 1, moisture adjustment may also be provided with wetting agent 14 in chamber 54 or with de-toxification agent 18 in chamber 58. Moisture is conveniently provided by water in liquid or vapor form, either alone or mixed with the wetting agent and/or the de-toxification agent or a combination thereof. Providing moisture as a part of the wetting agent solution is more convenient since chamber 56 may be eliminated.

Product 12 flows into de-toxification chamber 58 where it is mixed with de-toxicant 18 being supplied from de-toxicant storage container 60. The flow of de-toxicant from storage container 60 into reaction chamber 58 through inlet manifold 62 is conveniently controlled by inlet control 63. Inlet control 63 may be a regulator valve when, for example, de-toxicant 18 is under pressure, or a pump may be used for forcing de-toxicant 18 into chamber 58. Inlet manifold 62 assists in distributing de-toxicant 18 uniformly in chamber 58 so that it is thoroughly mixed with incoming product 12.

After being mixed With product 12 in chamber 58, un-reacted de-toxicant 18 is extracted from chamber 58 via exit manifold 64, from whence it flows via conduit 66 to a recovery system (not shown) for purification, if needed, and then returns via conduit 67 to storage container 60. Once product 12 has spent the required dwell time in contact with de-toxicant 18, it is removed from chamber 58 at outlet 70. The dwell time in chamber 58 is adjusted by controlling the rate of product feed and size of chamber 58. The larger chamber 58, the greater rate of product flow that may be obtained for a given required dwell time. A suitable drying chamber (not shown) may be provided at outlet 70, if desired.

While FIG. 3 shows an arrangement in which the de-toxicant is continuously passing through chamber 58, this is not essential. Good results are obtained by batch processing in which chamber 58 is charged with product and an amount of de-toxicant sufficient to treat the product load, the product and de-toxicant are maintained in contact for the desired dwell time, the de-toxicant and treated product are removed, and then the process repeated with the next load of product. The same procedure may also be followed in chambers 54 (and 56) With the Wetting agent and moisture adjust. Those of skill in the art will understand how to provide the valves and/or closures in chambers 54, 56, 58 to facilitate such steps.

Flow of product 12 through chambers 54-58 may be by gravity, conveyer, screw, ram, pump, fluidized bed, gas blast or other means, or a combination thereof. Those of skill in the art will understand, without undue experimentation, how to choose the most effective transport system or systems based on the type of product being treated, the required treatment times and the desired throughput.

The reaction of product 12 with de-toxicant 18 is exothermic, i.e., gives off heat. Hence, there is self-heating that raises the temperature of product 12 and reactant 18 within the reaction chamber during de-toxification. This is believed to be a direct result of the pre-treatment of the product with the wetting agent solution. The temperature rise facilitates rapid de-toxification. This is a great advantage of the invented method, since little or no external heat need be provided to enhance the reaction rate. Thus, the process is particularly economical.

It is desirable that the product temperature be as high as can be achieved while still avoiding or minimizing external heat input so as to obtain the most economical operation. Temperatures in the range of 20°-150° C. are effective with the present process, with the higher temperatures permitting very short (<0.5 hour) de-toxification times at atmospheric pressure. It is desirable that the reaction chamber and product reach about 50°-70° C., more desirably 60°-80° C. in order that to permit good de-toxification in processing times of about one hour or less at atmospheric pressure. It has been found that the exothermic reaction is sufficient to heat the product to peak temperatures in the range of at least about 50°-70° C. without external heat input and without an insulated reaction chamber, and at least 10° C. or higher with an insulated chamber. This self heating effect is highly desirable and, as far as is known, has not been utilized before for de-toxification.

Having thus described the invention, it will be apparent to those of skill in the art, that the present invention provides an improved method for de-toxifying agricultural products, particularly products contaminated with aflatoxins and the like. It will further be apparent that the invented method is particularly simple to employ and increases the effectiveness of known de-toxicants so that contaminated products may be de-toxified more economically and more quickly. It will be still further apparent that the invented method makes use of simple and inexpensive reaction chambers, that a pressurized system is not required and that little if any additional heat is needed to reach reaction temperatures that provide short reaction times. In addition, no post treatment is required to remove reaction products or unused de-toxicant, since it dissipates on reexposing the product to the air. Further, product treated according to the present invention is particularly resistant to aflatoxin reformation. This combination of attributes is of great practical utility and is a particular feature of the present invention.

While the present invention has been described for convenience of explanation in terms of particular products, wetting agents, diluents, carriers, and de-toxicants, those of skill in the art will understand based on the description herein that other products, other wetting agents, diluents, carriers and de-toxicants can also be used. Further, the process may optionally include further steps, as for example but not limited to, a final drying step and/or other intermediate or initial steps to adjust the properties of the product and the reactants. Accordingly, it is intended to include these and other variations as will occur to those of skill in the art based on the teachings herein in the claims that follow.

We claim:

1. A process for decontaminating agricultural products contaminated with aflatoxins or the like, comprising:
   providing the contaminated product;
   exposing the contaminated product to a wetting agent comprising a mixture of water and a soap, detergent or combination thereof;
   thereafter heating the product by exothermic reaction of anhydrous ammonia gas with the wetting agent treated product.

2. The process of claim 1 further comprising, prior to the step of exposing the contaminated product to a de-toxicant, adjusting the moisture content of the product.

3. The process of claim 1 wherein the heating step is performed in a thermally insulated vessel substantially without externally applied heat.

4. The process of claim 1 wherein the heating step is carried out in a substantially closed thermally insulated vessel.

5. The process of claim 4 wherein the heating step is carried out partly below atmospheric pressure.

6. The process of claim 1 wherein the exposing step comprises spraying the product with a mixture comprising water and a soap or detergent or both.

7. The process of claim 1 wherein the exposing step comprises adjusting the moisture content of the product to be in the steps of 15-35% by weight.

8. The process of claim 7 wherein the exposing step comprises adjusting the moisture content of the product to be in the range of 20-25% by weight.

9. The process of claim 1 further comprising adjusting the moisture content of the product to be in the range 15-35% during or before exposing the product to a detoxicant.

10. A process for reducing the aflatoxin level of foodstuffs, comprising:
    providing a foodstuff contaminated with aflatoxin;
    coating the foodstuff with a wetting agent comprising a material which promotes the absorption of water by the foodstuff; and
    exothermically heating the wetting agent coated foodstuff by reaction with ammonia gas.

11. The process of claim 10 wherein the exothermically heating step comprises reacting the wetting agent coated foodstuff with gaseous ammonia in a thermally insulated chamber substantially without applying external heat.

12. The process of claim 11 wherein the exothermically heating step is substantially carried out at or below atmospheric pressure.

13. The process of claim 12 further comprising, prior to the exposing step, adjusting the moisture content of the foodstuff to be in the range of 15-35% by weight.

14. The process of claim 10 wherein the exothermically heating step is carried out at least partly below atmospheric pressure.

15. The process of claim 10 wherein the coating step comprises coating with a mixture of water and about 0.5-50% by weight detergent or soap or a combination thereof.

16. The process of claim 10 wherein the coating step comprises coating with a mixture of about 1-10% by weight detergent or soap or a combination thereof and water.

17. A process for reducing the aflatoxin level in foodstuff comprising, exposing a predetermined amount of foodstuff to a wetting agent comprising a mixture of water and a soap or detergent or both, and then exposing the foodstuff to cool gaseous ammonia and heating the foodstuff by exothermic reaction with the gaseous ammonia for a predetermined time.

18. The process of claim 17 wherein the steps of exposing and heating by exothermic reaction comprises exposing to gaseous ammonia for a time at less than atmospheric pressure.

19. The process of claim 18 wherein the steps of exposing and heating the foodstuff comprises placing the foodstuff in a substantially closed thermally insulated chamber, charging the chamber with gaseous ammonia, disconnecting the ammonia supply and having the pressure within the chamber fall and the temperature of the foodstuff within the chamber rise substantially without venting or external heating of the chamber.

* * * * *